Figures 1, 2:
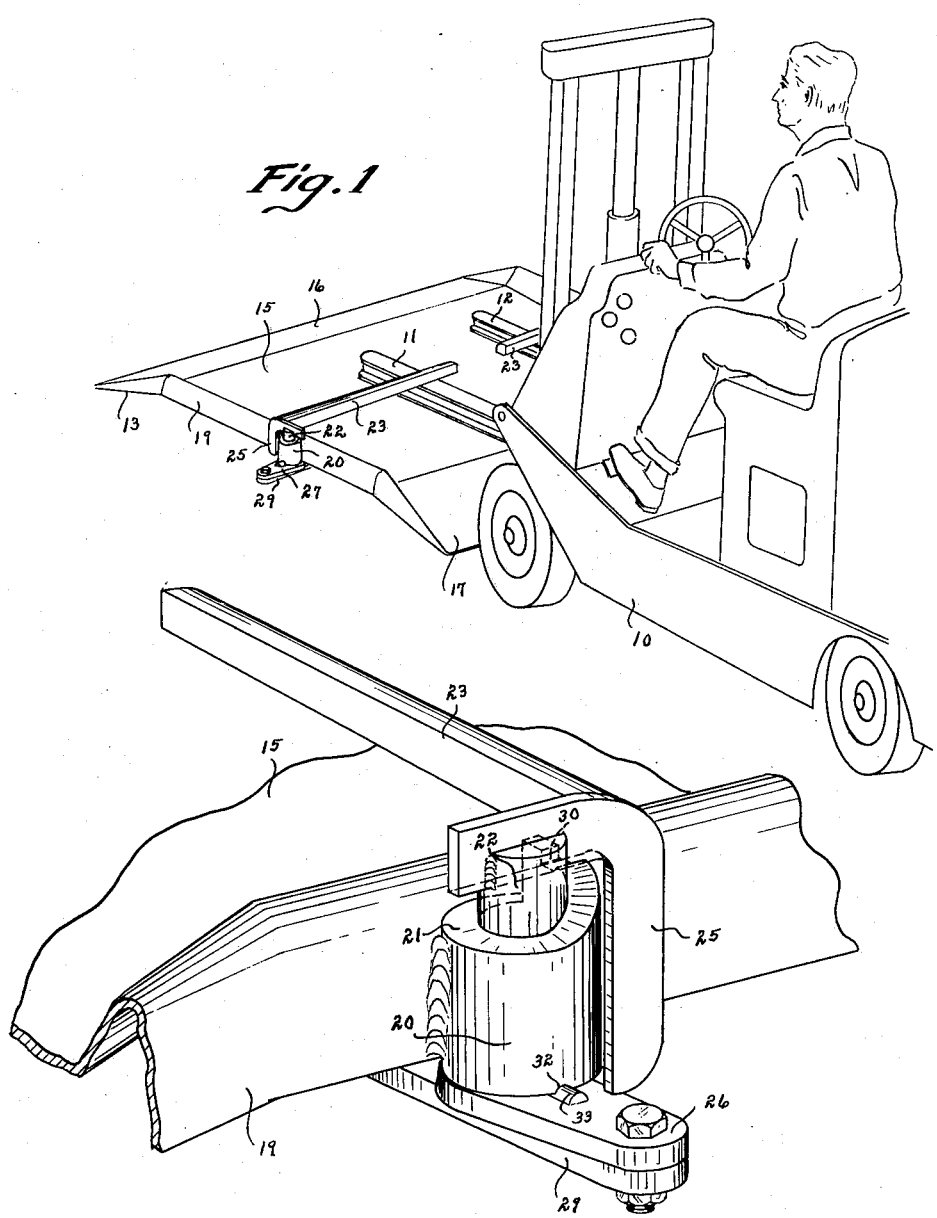

Oct. 30, 1962 W. B. NOLAND 3,061,125
PORTABLE DOCK PLATE PLATFORM
Filed Feb. 19, 1960 2 Sheets-Sheet 1

INVENTOR.
WAYNE B NOLAND
BY M. Talbert Dick
ATTORNEY

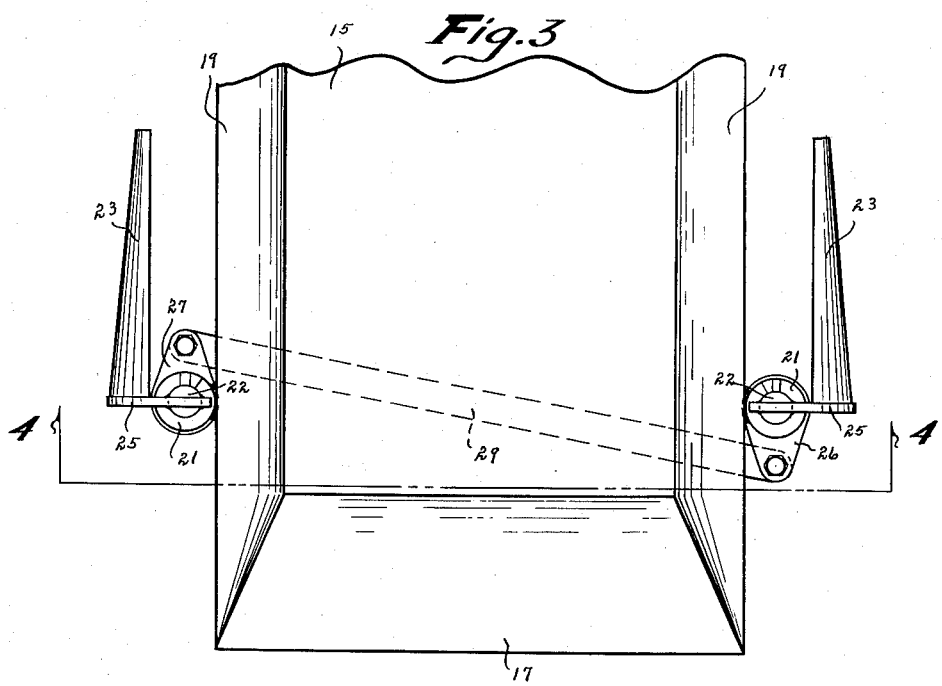
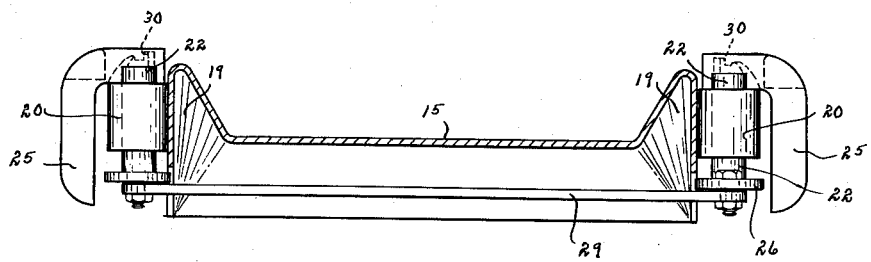

United States Patent Office 3,061,125
Patented Oct. 30, 1962

3,061,125
PORTABLE DOCK PLATE PLATFORM
Wayne B. Noland, Avon Lake, Iowa, assignor to Woodford Manufacturing Company, Des Moines, Iowa, a corporation of Iowa
Filed Feb. 19, 1960, Ser. No. 9,823
2 Claims. (Cl. 214—620)

This invention relates to loading and unloading dock plates and more particularly to a plate platform that may be engaged, lifted, and carried to point of use by a fork type tractor without the necessity of the operator of the tractor dismounting from the tractor.

Dock plates are extensively used and are usually employed to bridge the space between two spaced apart supporting surfaces, such as that of a loading or unloading dock and the bed of a hauling vehicle or like. Such dock plates or platforms are usually of iron and quite heavy. Their transportation and/or placement are therefore most difficult. In many cases they are handled by the hydraulic lifting fork of a tractor, but obviously they must be first secured to and then detached from the fork by some means such as chains, cables, clamps, or like. This requires the services of an extra helper, or else the operator of the tractor must dismount and remount at least twice to accomplish the mission of placing the dock plate into the desired position.

Therefore, one of the principal objects of this invention is to provide a dock plate platform that may be engaged, picked up and moved by a fork type tractor without necessitating the dismounting of the operator of the tractor.

More specifically, the object of this invention is to provide a dock plate having hinged arms that may be moved into effective positions by being engaged by a lifting tractor prior to the movement of the dock platform by the tractor.

A still further object of this invention is to provide a dock platform having movable arms to facilitate its lifting that are capable of being moved to non-obstructive positions when not in use.

Still further objects of this invention are to provide an efficient dock plate platform that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a perspective view of my dock plate being lifted and carried by a tractor having a hydraulically actuated lifting fork, FIG. 2 is an enlarged perspective view of the bearing portion of one of the arms of my dock plate, FIG. 3 is a top plan view of my device and more fully illustrates its construction, and FIG. 4 is a cross sectional view of my dock plate platform taken on line 4—4 of FIG. 3.

In the drawings I have used the numeral 10 to designate an ordinary tractor having the usual two hydraulically actuated lifting fork prongs 11 and 12. The numeral 13 generally designates an ordinary dock plate having the central section 15, the two approach sections 16 and 17, and a strengthening rib 19 at each side thereof, as shown in FIG. 1. It is to such equipment that I install my invention and which I will now describe in detail.

On the outer side of each side strengthening rib 19, and adjacent the central section 15 of the dock plate, is a vertical bearing member 20. Each of these bearing members 20 has its upper marginal edges in the form of a spiralling cam surface 21, as shown in FIG. 2. This cam surface 21 spirals forwardly and upwardly relative to the rear approach portion 17. Rotatably and slidably mounted in each of the bearing members 20 is a vertical shaft 22. Operatively secured to the top of each shaft 22 is a horizontal arm 23. Also operatively secured to the top of each shaft 22 is an actuating bar 25 which extends first horizontally to engage and slidably ride on the adjacent spiral cam surface 21, and then extends vertically downwardly at the side of the adjacent bearing 20, as shown in FIG. 4. If desired, the arm 23 and actuating bar 25 may be of one piece. When the two arms 23 are extending forwardly and parallel with the side ribs 19, as shown in FIG. 3, these arms 23 will be in non-operative positions and out of the way during the actual usage of the platform dock. Also, when these arms 23 are in such inoperative positions, the bars 25 will be to the rear and engaging the lowest surface of their adjacent cam surface 21, as shown in FIG. 4. Furthermore, the two bars 25 will be extending laterally away from the dock plate and substantially on lines transversely of the longitudinal axis of the dock plate, as shown in FIG. 3. When the two arm units 23 are extending, as shown in FIG. 3, there is a rearwardly extending projection 26 on the bottom of the shaft 22 that is positioned at the right of the dock plate, and a forwardly extending projection 27 on the lower end of the shaft 22 which is at the left of the dock plate. The numeral 29 designates a bar having one end hinged to the outer rear end of the projection 26 and its other end hinged to the forward outer end of the projection 27. This linkage bar extends under the dock plate and operatively connects the two arms 23 so that if one arm 23 is moved inwardly toward the dock plate, or outwardly from the dock plate, the other arm will also move in unison with the other.

To use my device, all that the operator of the tractor has to do is to run the wheel of his tractor, or one of the forks 11 or 12, against the downwardly extending portion of one of the bars 25, thereby forcing it forwardly. This action rotates its shaft 22 and, by virtue of the linkage between the two arms, both arms 23 will be moved to positions across the portion 15 of the dock plate. A stop 30 is on each of the bearings 20 at the top of its spiral surface 21 for limiting the swinging movement of the arms 23 so that they will not be swung past the transverse center line of the dock plate. The two arms 23 will be extending toward each other as shown in FIG. 1, and a space will exist between the bottoms of the arms 23 and the upper surface of the central portion 15 of the dock plate. With the arms in such positions it is merely necessary for the operator of the tractor to place the hydraulic lifting forks under the arms 23, and elevate the hydraulically actuated fork means which in turn will raise the dock plate. At this time the dock plate may be easily carried by the tractor to point of use. After the dock plate has been placed for use, it is merely necessary to withdraw the lifting forks from under the arms 23, and then bump the arms 23 forwardly whereby they will slide downwardly on the spiral surfaces 21 until they reach forwardly extending positions at the side of the dock plate. To yieldingly hold the arms 23 in any desired position in their swinging movement, one or more notches 32 may be placed in the lower marginal edge of the bearing 20, and which are capable of being entered by a spring loaded lug or like 33 on the projections 26 and 27. Such notches 32 and lugs 33 are recommended for holding the arms 23 in effective positions, as shown in FIG. 1. By the cam surfaces 21 spiralling upwardly and forwardly, the arms 23 will be accordingly raised to clear the side strengthening ribs 19 as they are swinging into positions. When the arms 23 are extending forwardly and in inoperative positions, they will be in lowered positions at the sides of the two side strengthening ridges, respectively.

From the foregoing, it will readily be seen that I have provided a dock plate platform that may be engaged, lifted, and carried by a hydraulic fork type tractor without the operator of the tractor dismounting from this vehicle.

Some changes may be made in the construction and arrangement of my portable dock plate platform without departing from the real spirit and purpose of my invention, and it is my intention to cover by my claims, any modified forms of structure or use of mechanical equivalents which may be reasonably included within their scope.

I claim:

1. In a portable platform, a platform having two side areas, a vertical bearing on each side area of said platform, a vertical shaft rotatably mounted in each of said bearings, a horizontal arm means secured to the upper end of each of said shafts; a spiral cam surface on each of said bearings slidably engaged by the adjacent arms means; said spiral cam surfaces being so positioned that said arm means will be yieldingly held by force of gravity in positions longitudinally of the two side areas, respectively, of said platform; a projection on the lower end of each of said shafts, and a linkage connecting said two projections whereby the movement of one of the horizontal arm means will accordingly move the other said horizontal arm means.

2. In a portable platform, a platform having two side areas, a vertical bearing on each side area of said platform, a vertical shaft rotatably mounted in each of said bearings, a horizontal arm means secured to the upper end of each of said shafts; a spiral cam surface on each of said bearings slidably engaged by the adjacent arm means; said spiral cam surfaces being so positioned that said arm means will be yieldingly held by force of gravity in positions longitudinally of the two side areas, respectively, of said platform; said side areas of said platform extending upwardly to a horizontal plane above the horizontal plane of the central area of said platform, a projection on the lower end of each of said shafts, and a linkage connecting said two projections whereby the movement of one of the horizontal arm means will accordingly move the other said horizontal arm means.

References Cited in the file of this patent
UNITED STATES PATENTS

| | | |
|---|---|---|
| 2,452,289 | Bryson | Oct. 26, 1948 |
| 2,461,678 | Christensen | Feb. 15, 1949 |
| 2,582,759 | Sass | Jan. 15, 1952 |
| 2,739,325 | Grace | Mar. 27, 1956 |